US011791510B2

(12) United States Patent
Powell et al.

(10) Patent No.: US 11,791,510 B2
(45) Date of Patent: Oct. 17, 2023

(54) TWO PHASE EXOTHERMIC COOLING

(71) Applicant: The Government of the United States of America, as represented by the Secretary of the Navy, Arlington, VA (US)

(72) Inventors: Brandon Powell, Washington, DC (US); Michael R Dixon, Jr., Washington, DC (US); Jesse Maxwell, Washington, DC (US); Rachel Carter, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 122 days.

(21) Appl. No.: 16/851,016

(22) Filed: Apr. 16, 2020

(65) Prior Publication Data

US 2020/0335841 A1    Oct. 22, 2020

Related U.S. Application Data

(60) Provisional application No. 62/834,812, filed on Apr. 16, 2019.

(51) Int. Cl.
*H01M 10/6569* (2014.01)
*H01M 10/613* (2014.01)
(Continued)

(52) U.S. Cl.
CPC ........ *H01M 10/6569* (2015.04); *F28D 15/02* (2013.01); *H01M 10/613* (2015.04);
(Continued)

(58) Field of Classification Search
CPC .... F28C 3/00; F28D 15/02; F28D 2021/0043; H01M 10/613; H01M 10/6563; H01M 10/6567; H01M 10/6569; Y02E 60/10
See application file for complete search history.

(56) References Cited

U.S. PATENT DOCUMENTS

| 6,434,955 B1* | 8/2002 | Ng | F25B 25/00 62/480 |
| 2016/0079637 A1* | 3/2016 | Nemesh | H01M 10/6569 429/62 |
| 2021/0184295 A1* | 6/2021 | Azzouz | H01M 10/6569 |

FOREIGN PATENT DOCUMENTS

| CA | 02286701 A1 | 10/1998 |
| CN | 106684499 A | 5/2017 |

(Continued)

OTHER PUBLICATIONS

Related PCT/US2020/028576; International Preliminary Report on Patentability Chapter I; dated Sep. 28, 2021; 7 pages.

(Continued)

*Primary Examiner* — Lingwen R Zeng
(74) *Attorney, Agent, or Firm* — US Naval Research Laboratory; Nigel R. Fontenot

(57) ABSTRACT

A method of cooling a battery cell includes: atomizing a cooling fluid by driving it through a micro-nozzle at a pressure sufficient to create a jet of aerosolized liquid droplets while retaining sufficient momentum in flow of the fluid to travel from the nozzle to an outer surface of the battery cell; impinging the spray of the jet of aerosolized liquid droplets on an outer surface of the battery cell; partially evaporating the liquid droplets on the outer surface to conduct heat from the outer surface; and convecting heat from the outer surface of the battery via the cooling fluid.

16 Claims, 5 Drawing Sheets

(51) Int. Cl.
*H01M 10/6567* (2014.01)
*F28D 15/02* (2006.01)
*F28D 21/00* (2006.01)
*H01M 10/6563* (2014.01)
*F28C 3/00* (2006.01)

(52) U.S. Cl.
CPC .......... *H01M 10/6567* (2015.04); *F28C 3/00* (2013.01); *F28D 2021/0043* (2013.01); *H01M 10/6563* (2015.04); *Y02E 60/10* (2013.01)

(56) References Cited

FOREIGN PATENT DOCUMENTS

| | | |
|---|---|---|
| JP | H10208781 A | 8/1998 |
| JP | 2001-519080 A | 10/2001 |
| JP | 2016-092007 A | 5/2016 |
| JP | 2018063766 A | 4/2018 |
| JP | 2018133134 A | 8/2018 |

OTHER PUBLICATIONS

Related PCT/US2020/028576; Written Opinion of the International Searching Authority; dated Jul. 31, 2020; 6 pages.
Related PCT/US2020/028576; International Search Report; dated Jul. 31, 2020; 4 pages.
Google Patents English Translation of JP2016-092007A Specification; Translation run on Dec. 21, 2022; 7 pages.
Related EP Application, EP3935685, Supplementary European Search Report, dated Dec. 2, 2022, 2 pages.
Related EP Application, EP3935685, European Search Opinion, dated Dec. 2, 2022, 2 pages.
CN106684499A, Google Patents English Translation, 8 pages.
JPH10208781A, Google Patents English Translation, 8 pages.
JP2018133134A, Google Patents English Translation, 6 pages.
JP2018063766A, Google Patents English Translation, 12 pages.

* cited by examiner

TWO PHASE EXOTHERMIC COOLING

RELATED APPLICATIONS

This application claims the benefit of U.S. Provisional Application No. 62/834,812 filed Apr. 16, 2019, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 110845.

FIELD OF INVENTION

The present invention relates generally to battery cooling, and more particularly to cooling batteries using two phase fluid quenching.

BACKGROUND

High energy-density batteries are at the forefront of energy storage, as they provide significantly more energy storage per unit volume and unit mass compared to their predecessors. With increasing amounts of energy packed into high-efficiency structure, the volatility of these batteries has become a safety risk. Improper charging and discharging, manufacturing defects, and poor mechanical or thermal design can allow these high energy-density battery cells to reach a "thermal runaway" state: a self-reinforcing thermo-chemical heating cycle in which excessive heat accelerates the reaction creating the heat exponentially, resulting in a violent energy release. In extreme cases, this has led to explosions. Several instances have occurred where the battery packs have gone into thermal runaway and destroyed objects in close proximity. Thermal runaway has been the cause of several high-profile failures over the past few years as high energy-density batteries have become standard in the commercial market, from consumer devices to airliners.

The current state of the art for managing thermal runaway is one or more of the following methods:

1. Use of a solid-liquid phase change material (PCM) to prevent neighboring cells in a battery pack from rising above 100° C., where the thermal runaway does not propagate. This allows the cell in thermal runaway to burn itself out without initiating thermal runaway in neighboring cells. While this prevents the propagation of thermally-induced failure to adjacent cells, it requires a substantial addition of volume and mass of PCM to a battery pack.

2. Increase space and material between cells to reduce the temperature of surrounding cells. This allows the cell in thermal runaway to burn itself out without propagating to adjacent cells. While this method prevents the propagation of thermally-induced failure to adjacent cells, it requires a substantial addition of casing volume and mass to a battery pack 3. Liquid cooling loop. This technique requires a circulating fluid system, a pump, and power. The power required to operate the cooling system makes the overall battery pack less efficient. This system has significant size, weight, and complexity implications.

4. Run an extremely low temperature fluid through channels touching the battery. This requires a maintained circulating fluid and cost associated with that system. It also requires power to operate, making the overall battery pack less efficient. Finally, it also requires a low temperature operating fluid, which would require a relatively large thermal back-end chiller/refrigeration system.

SUMMARY OF INVENTION

While effective for halting the propagation of thermally-induced damage to nearby cells, there are critical disadvantages to the methods described above. High energy-density batteries are desirable because of their compact size and low weight, whereas these methods substantially increase mass, volume, power requirements, and possibly add active control. The current state of the art in battery pack design is to minimize the propagation of thermal runaway to adjacent cells. There is currently no technology that stops a cell's thermal runaway already in progress without substantial impact to the overall system architecture, weight, and volume of a battery pack.

Therefore, presented are methods and systems to prevent thermal runaway of a high-energy-density battery cell by actively or passively cooling the cell by external atomized-jet spray impingement of a two-phase heat transfer fluid. The heat transfer fluid may optionally be pre-pressurized for isentropic expansion to low temperature prior to spray impingement, or may be optionally stored and sprayed under saturation conditions to enable maximum evaporation efficiency.

According to one aspect of the invention, a method of preventing and stopping thermal runaway in a high energy-density battery cell includes atomizing a cooling fluid by driving it through a micro-nozzle at a pressure sufficient to create a jet of aerosolized liquid droplets while retaining sufficient momentum in flow of the fluid to travel from the nozzle to an outer surface of the battery cell; impinging the spray of the jet of aerosolized liquid droplets on an outer surface of the battery cell; partially evaporating the liquid droplets on the outer surface to conduct heat from the outer surface; and convecting heat from the outer surface of the battery via the cooling fluid.

Optionally, the method includes isentropically cooling the fluid via expansion of the fluid through the micro-nozzle.

Optionally, the step of atomizing is configured to occur when the battery cell is in or approaching thermal runaway.

Optionally, the step of atomizing is configured to occur when the battery cell is at or above the saturation temperature of the fluid.

Optionally, the method includes holding the battery cell under hermetic sealing at a saturation pressure of the fluid in order to enhance vaporization.

Optionally, the micro-nozzles have locations, direction, and profiles configured based on a heating profile of the battery cell in space and time, a flow rate through the nozzle, and fluid dynamics of the atomized fluid on the battery surface.

Optionally, the method includes routing the fluid through a fluid network integrated into a structure of a battery pack containing the battery cell.

Optionally, the fluid network comprises an internal network of fluid channels in a composite structure.

Optionally, the atomization is configured to end after thermal runaway is prevented and before complete quenching is achieved.

Optionally, the atomization is configured to sequentially pulse on and off to iteratively cool the battery cell.

Optionally, the fluid is R 134a.

Optionally, the micro-nozzle has a diameter of approximately 0.013 in.

Optionally, the battery cell is an 18650 battery and the step of atomizing includes atomizing through 20 spray nozzles.

Optionally, the vaporizing initiates when the battery cell reaches a temperature of approximately 130° C.

Optionally, the vaporizing initiates when the battery cell reaches a temperature of approximately 106° C.

Optionally, the vaporizing initiates when the battery cell reaches a temperature of approximately 90° C.

The foregoing and other features of the invention are hereinafter described in greater detail with reference to the accompanying drawings.

DETAILED DESCRIPTION

Two-Phase Exothermic Quenching (TPEQ) is the proposed method of preventing and stopping thermal runaway in a high energy-density battery cell by the spray impingement of an evaporating jet of cooling fluid. A cooling fluid is atomized by driving it through a micro-nozzle at moderate pressure to create a jet of aerosolized liquid droplets while retaining substantial momentum in the flow. The pressurized storage of a working fluid would optionally allow isentropic cooling of the fluid during expansion through the nozzle. The atomized jet impinges on the exterior surface (e.g., cylindrical surface) of the cell where heat transfer is enhanced by two primary mechanisms: partial evaporation of the droplets and convection of the two-phase fluid jet. The heat transfer coefficient attainable by single-phase convection alone can easily be 1-2 orders of magnitude less than the proposed method, yielding significantly improved thermal capability compared to the single-phase method.

With the nozzles directing atomized fluid toward a battery cell that is in or approaching thermal runaway, small liquid droplets impinge on the surface of the cell. With the cell at or above the saturation temperature of the selected fluid, the fluid vaporizes. The cell is optionally held under hermetic sealing at the saturation pressure of the working fluid in order to enhance vaporization. The production of vapor extracts thermal energy from the cell, resulting in rapid cooling of the cell and reversing thermal runaway.

Figure 1:
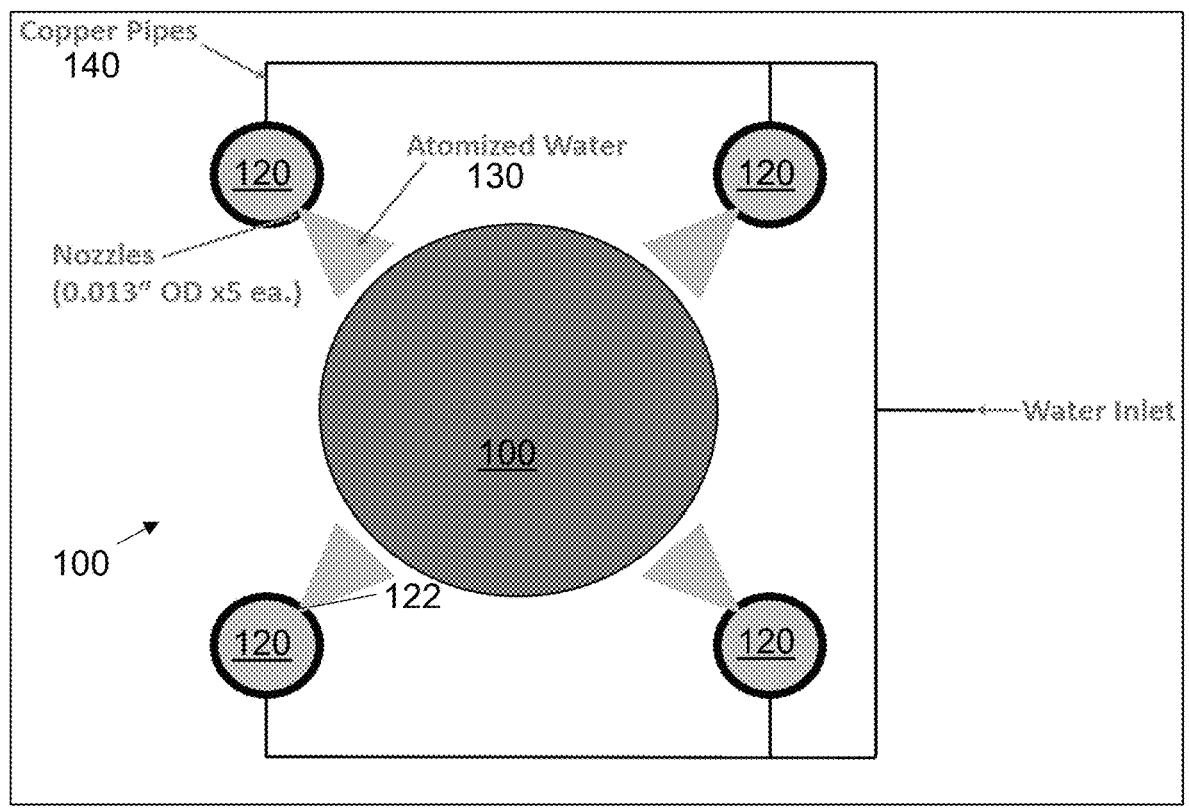
FIG. 1 shows a schematic representation of an exemplary cooling system for a single battery cell.

FIG. 1 shows an exemplary schematic design in which the system 100 includes a battery 110, a plurality of sprayers 120 each having a spray nozzle 122 for spraying the two-phase fluid 130. Each sprayer 120 may be fed by a conduit 140 such as a pipe, tube, or other fluid transport means.

In a proof-of concept design, four copper tubes run parallel to the central axis of an 18650 battery. Five 0.013" diameter holes were machined with equal spacing into the fluid supply tubes for a total of 20 spray nozzles directed toward the surface of the battery. The copper tubes were connected with a common manifold to a pressurized reservoir of water held at 50 psig. The flow of the fluid was controlled by an electric solenoid valve set for manual actuation.

In order to induce thermal runaway, the battery cell and spray cooling assembly was placed in a calorimeter. The calorimeter slowly raised the environmental temperature until it sensed the battery self-heating (exotherm). Once self-heating was detected, the calorimeter controller matched the temperature of a thermocouple on the battery in order to maintain an adiabatic environment.

Once the test was initiated, the calorimeter began heating the battery. At 80° C., battery self-heating (exotherm) was detected (dT/dt>onset) and the calorimeter matched the temperature of the battery to maintain an adiabatic environment.

Figure 2:
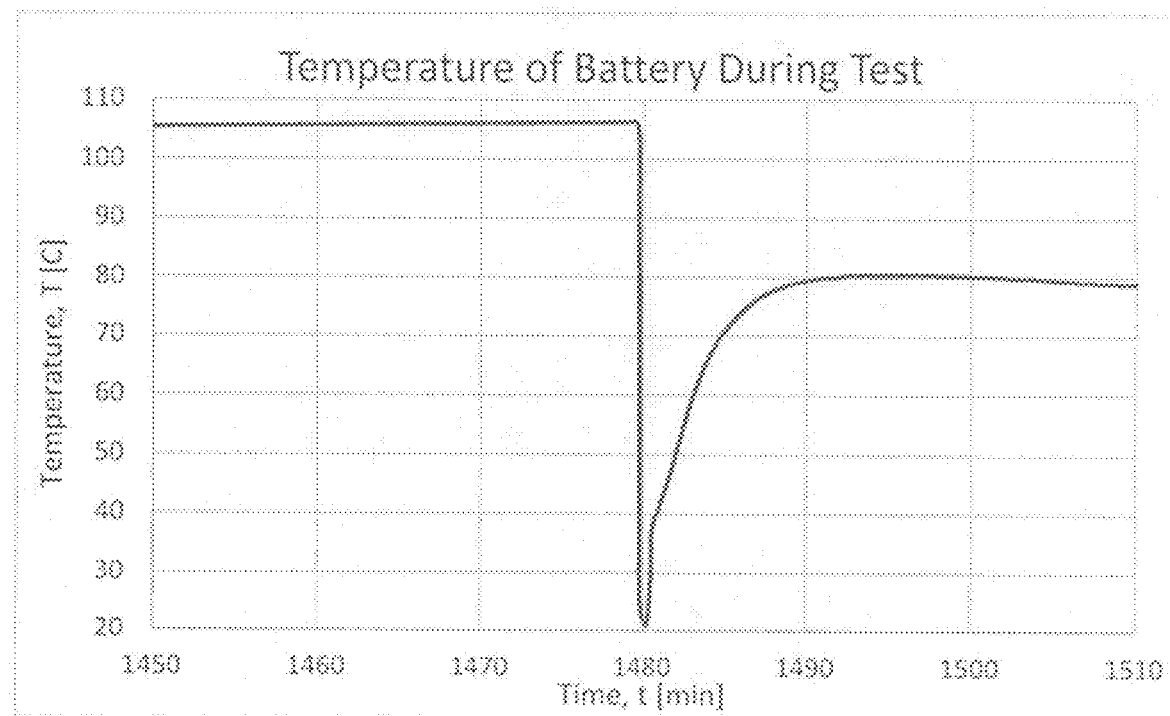
FIG. 2 shows exemplary results of battery surface temperature during a test of an exemplary cooling method.

At 106° C., it was determined by the test conductors that the battery was in thermal runaway and that the rate of temperature increase would have resulted in catastrophic failure if allowed to continue self-heating. At this point, the TPEQ solenoid valve was manually activated for approximately 25 seconds. Approximately 1.0 L of water was released during the experiment. The temperature quenching of a reference thermocouple on the outside cylinder wall of the battery is shown below in FIG. 2.

Figure 3:
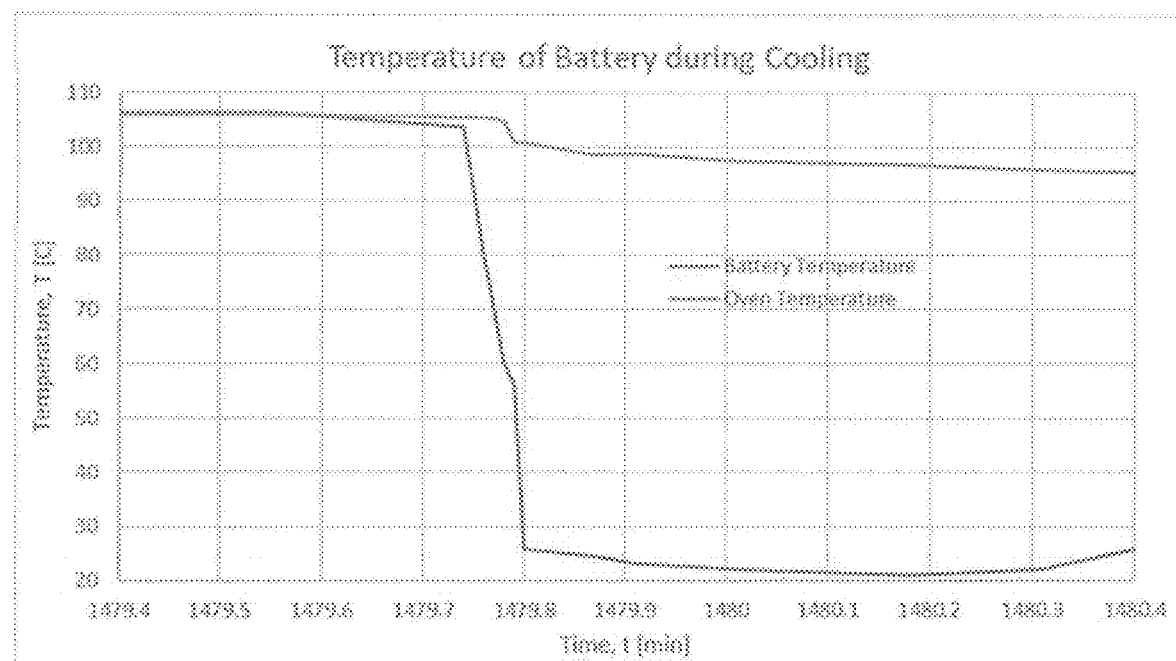
FIG. 3 shows a closer view of the exemplary results of FIG. 2.

The temperature of the battery surface dropped from 106.3° C. to 25.8° C. in approximately 3 seconds, corresponding to 120 g of water dispersal. The cell ultimately fell to a temperature of 20.9° C. after 25 seconds. A closer view of the quenching action is shown in FIG. 3.

Figure 4:
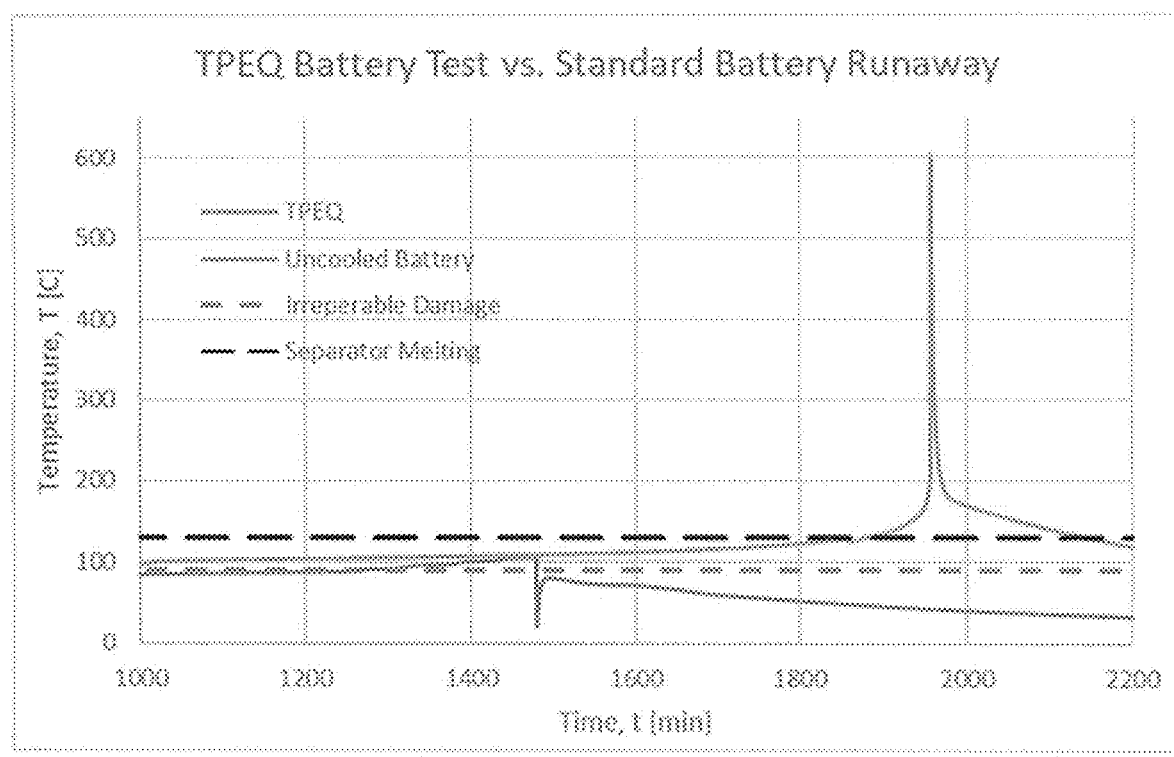
FIG. 4 shows a comparison of a battery under normal thermal runaway conditions to the battery that was cooled using an exemplary method.

The results of this test are provided in comparison to a similar 18650 Li-ion battery in the same test environment in FIG. 4.

The uncooled reference battery in the same environment reached a peak temperature of 603° C. during thermal runaway. A 2014 study showed that at approximately 90° C. the solid electrolyte interface (SEI) in the battery begins to decompose and at approximately 130° C. the Polyethylene-based separator in the battery begins to melt. 90° C. is therefore defined in this study as the "irreparable damage" threshold, at which point the cell will no longer function properly once cooled to an acceptable operating temperature. 130° C. is the point at which thermal runaway begins to fully occur. FIG. 3 showed that the TPEQ system allowed the battery to reach the point of irreparable damage without interference at which point the quenching process prevented the battery from heating further, ultimately avoiding thermal runaway.

The final result of this POC test was that quenching a battery with water in an ambient air atmosphere was able to pull enough thermal energy out of the battery to prevent thermal runaway.

Optional exemplary improvements to the basic design discussed above include:

1. Nozzle geometry may be more optimally selected and machined based on knowledge of fluid atomization and high-momentum, single- or multi-phase fluid jets.

2. Nozzle locations, direction, and quantity may be optimally selected based on heating profile of the battery cell in space and time, the flow rate through the nozzle, and the fluid dynamics of the atomized fluid on the battery surface.

Figure 5:
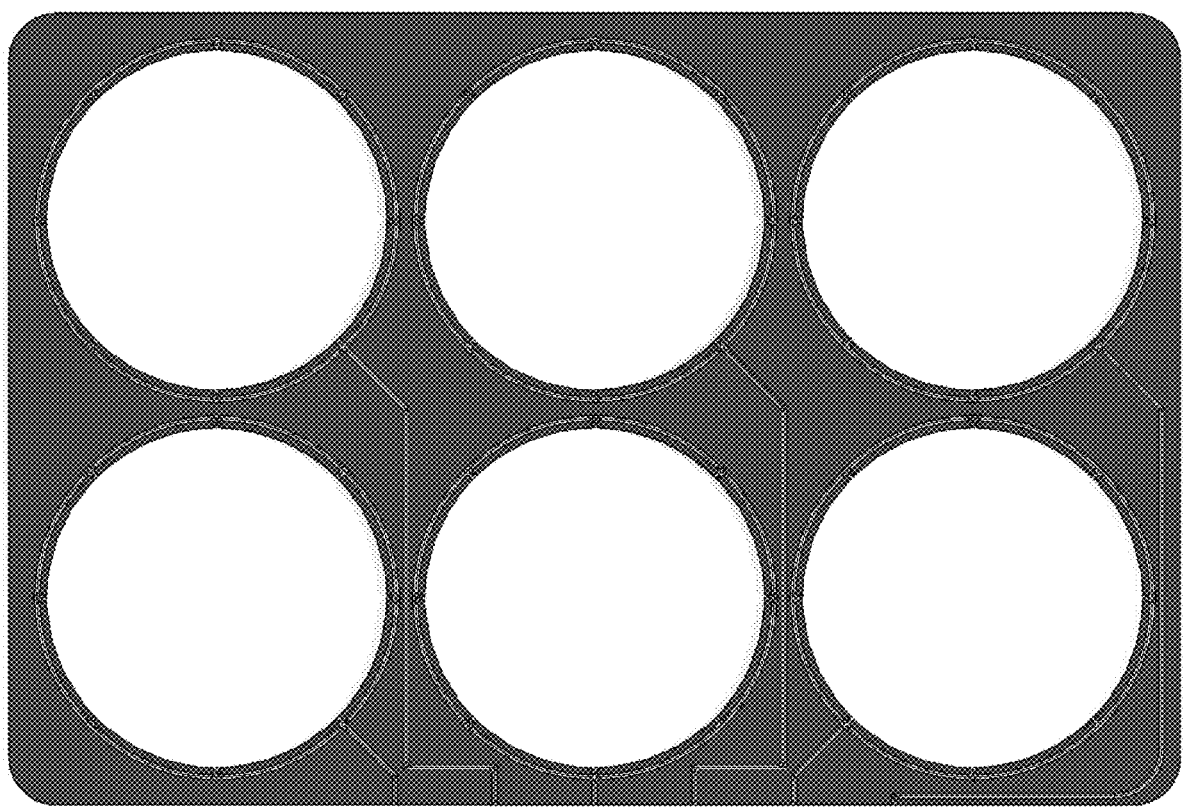
FIG. 5 shows an exemplary embedded network of fluid passageways in an exemplary battery pack having multiple battery cells.

3. Fluid networks may be integrated into the structure of the battery pack as shown, for example, in FIG. 5. Simple manufacturing methods capable of integrating internal high-pressure fluid channels into a composite structure, for example, could improve the system weight, cost, and manufacturability.

4. Less working fluid may be used to reduce total system weight. 96% of the cooling during the experiment occurred in only 3 seconds, during which time the system released approximately 120 g of water. The thermal runaway self-heating reaction rate is exponentially dependent upon temperature, suggesting that just a small amount of cooling can prevent runaway and a complete quenching to ambient temperature is not necessary. Furthermore, sequential or pulsed quenching could result in a more efficient use of fluid by optimizing the temperature differential at the external interface of the batter with the cooling fluid and the heat transfer rate from the interior of the battery to the exterior surface.

5. A hermetically sealed environment may be used with a working fluid at its saturation conditions in order to enhance the fraction of evaporation. This would reduce the amount of working fluid needed.

6. Different working fluids may be used with various advantages. For example, at atmospheric pressure the saturation temperature of R 134a is approximately −25° C., which would enhance the evaporation fraction, and its expansion from high pressure would pre-cool the impinging jet.

The primary advantages of using TPEQ to prevent thermal runaway are:

1. Spray cooling can improve surface heat transfer by at least an order of magnitude compared to single-phase convective heat transfer.

2. The implementation of TPEQ can be performed both actively and passively by using either a pump or pressurized system. This versatility in configuration makes the technology adaptable to many different environments and applications than the current state of the art.

3. Spray cooling can use any working fluid compatible with the materials the fluid is used to cool.

4. Due to the highly efficient heat transfer and the small amount of thermal energy removal required to halt thermal runaway, the system requires a very small amount of working fluid.

5. Cell combustion and explosion is prevented, improving system-level safety.

6. The system optionally does not require power to operate. It may be configured with passive actuation such as tunable-melting-temperature nozzle blockages or a fluid reservoir under saturation with a design burst point, or it may be actively controlled based on cell temperature monitoring and an actuation algorithm.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of preventing and stopping thermal runaway in a high energy-density battery cell, the method comprising the steps of:
   atomizing a cooling fluid by driving it through a micro-nozzle at a pressure sufficient to create a jet of aerosolized liquid droplets while retaining sufficient momentum in flow of the fluid to travel from the micro-nozzle to an outer surface of the battery cell, wherein the micro-nozzle cretes the jet via passive actuation via a tunable-melting-temperature nozzle blockage configured to melt at a temperature based on experimental results associated with battery self-heating;
   impinging the spray of the jet of aerosolized liquid droplets on an outer surface of the battery cell;
   partially evaporating the liquid droplets on the outer surface to conduct heat from the outer surface; and
   convecting heat from the outer surface of the battery via the cooling fluid.

2. The method of claim 1, further comprising:
   isentropically cooling the fluid via expansion of the fluid through the micro-nozzle.

3. The method of claim 1, wherein the step of atomizing is configured to occur when the battery cell is in or approaching thermal runaway.

4. The method of claim 1, wherein the step of atomizing is configured to occur when the battery cell is at or above the saturation temperature of the fluid.

5. The method of claim 1, further comprising:
   holding the battery cell under hermetic sealing at a saturation pressure of the fluid in order to enhance vaporization.

6. The method of claim 1, wherein the micro-nozzle has a location, direction, and profile configured based on a heating profile of the battery cell in space and time, a flow rate through the micro-nozzle and fluid dynamics of the atomized fluid on the battery surface.

7. The method of claim 1, further comprising:
   routing the fluid through a fluid network integrated into a structure of a battery pack containing the battery cell.

8. The method of claim 7, wherein the fluid network comprises an internal network of fluid channels in a composite structure.

9. The method of claim 1, wherein the atomization is configured to end after thermal runaway is prevented and before complete quenching is achieved.

10. The method of claim 1, wherein the atomization is configured to sequentially pulse on and off to iteratively cool the battery cell.

11. The method of claim 1, wherein the fluid is R 134*a*.

12. The method of claim 1, wherein the micro-nozzle has a diameter of approximately 0.013 in.

13. The method of claim 1, wherein the battery cell is an 18650 battery and the step of atomizing includes atomizing through 20 spray micro-nozzles.

14. The method of claim 1, wherein the vaporizing initiates when the battery cell reaches a temperature of approximately 130° C.

15. The method of claim 1, wherein the vaporizing initiates when the battery cell reaches a temperature of approximately 106° C.

16. The method of claim 1, wherein the vaporizing initiates when the battery cell reaches a temperature of approximately 90° C.

* * * * *